Patented Mar. 26, 1940

2,195,215

UNITED STATES PATENT OFFICE 2,195,215

GRINDING WHEEL

Samuel S. Kistler, West Boylston, and Carl E. Barnes, Worcester, Mass., assignors to Norton Company, Worcester, Mass., a corporation of Massachusetts No Drawing. Application October 23, 1937, Serial No. 170,644

4 Claims. (Cl. 51—280)

The invention relates to grinding wheels and other abrasive bodies.

One object of the invention is to provide a superior cam grinding wheel. Another object of the invention is to provide a more durable and heat resistant grinding wheel. Another object of the invention is to obtain highly reactive resins that will cure more rapidly and completely when used as bonding agents for the manufacture of grinding wheels. Another object of the invention is to provide an alkyd resin for a grinding wheel bond which will cure quickly. Another object of the invention is to provide an alkyd resin bonded grinding wheel of superior qualities. Another object of the invention is to provide a synthetic resin bonded grinding wheel having certain of the properties of a rubber bonded wheel. Other objects will be in part obvious or in part pointed out hereinafter.

The invention accordingly consists in the features of construction, combinations of elements, and arrangements of parts, and in the several steps and arrangement and order of each of said steps to one or more of the others thereof, all as will be illustratively described herein, and the scope of the application of which will be indicated in the following claims.

We provide abrasive in the form of grain of aluminum oxide, silicon carbide, or of any other suitable substance, such as quartz, garnet, emery, diamond. This abrasive grain we bond with a synthetic polymerizable resin of the kind now known as alkyd resins, which are defined as the reaction products of polybasic acids with polyhydric alcohols. We may use any one of the polyhydric alcohols, for example glycerol (glycerine), anhydroenneaheptitol, pentaerythritol and pentaglycerol. The grain and bond, in suitable proportions, may be mixed in any known or desired manner, placed in a mold, pressed either in a hot press or a cold mold, and given a suitable heat treatment, if desired partly in the hot press and thereafter, or if the wheel is cold molded, entirely in an oven.

The acid which alone has gone into extensive commercial use prior to our invention as a main constituent of the bond for alkyd resin bonded grinding wheels is phthalic anhydride. We have found that maleic acid, or anhydride, or its isomer, fumaric acid, forms, with the various polyhydric alcohols, a resin which, used as the bond for grinding wheels produces a stronger, more heat resistant wheel. We believe this to be because the molecule of maleic acid is nearly the smallest of the dibasic acids and because consequently resins made with it have nearly a maximum of primary valence cross linkages per unit volume. Ionization constants of maleic and fumaric acids compared with phthalic acid are shown in the following table:

TABLE I

*Ionization constants*

| Acid | First hydrogen ion | Second hydrogen ion |
|---|---|---|
| Phthalic | .00126 | .0000031 |
| Maleic | .015 | .00000026 |
| Fumaric | .001 | .00003 |

The larger the ionization content, the stronger is an acid. It will be seen that the first ionization of maleic acid has a constant over ten times larger than that of phthalic acid. Although the second ionization constant of maleic acid is smaller than that of phthalic acid, the maleic acid is converted during the esterification process to fumaric acid, so that the ionization constant for fumaric acid should be used for the second hydrogen ion. Here again the constant is practically ten times that of phthalic acid.

We have made tests on the gelling time of resins made by heating phthalic anhydride and maleic anhydride respectively with glycerol and pentaerythritol respectively as shown in the following table. In these tests the temperature was maintained constant at two hundred degrees centigrade and each batch was of the same size and stirred at the same rate.

TABLE II

*Gelling time at 200° C.*

|  | Minutes |
|---|---|
| Phthalic anhydride—glycerol | 195 |
| Maleic anhydride—glycerol | 35 |
| Phthalic anhydride—pentaerythritol | 110 |
| Maleic anhydride—pentaerythritol | 23 |

With either alcohol it takes approximately five times as long to reach the gel point with phthalic anhydride as it does with maleic anhydride. Another advantage of the maleic anhydride is that it can link with the unsaturated bonds of drying oil acids, thus making it possible to obtain strong resins of the oil modified type that are both oxygen and heat convertible. Certain of these resins make resilient grinding wheels of unusual properties.

For specific examples of the manufacture of alkyd resin bonded grinding wheels according to the present invention we may proceed as follows:

EXAMPLE I

One hundred and forty-seven grams (1.5 mols) of maleic anhydride are heated with ninety-two grams (1 mol) glycerol to a temperature of two hundred degrees centigrade for approximately thirty minutes, taking care not to pass the gel point. One hundred and twenty grams of this molten resin are thoroughly mixed with eight hundred and eighty-five grams of forty-six mesh fused alumina abrasive grain previously heated, the mixture is spread in a heated mold, and pressed to a volume of four hundred cubic centimeters. When cold the "green" wheel is removed from the mold and baked for twenty-four hours in an oven with an initial temperature of one hundred and ten degrees, which slowly rises during the twenty-four hours to one hundred and fifty degrees centigrade. The wheel is then kept at one hundred and fifty degrees for another twenty-four hours. The wheel so made is decidedly superior to a similar wheel made with glyceryl phthalate.

EXAMPLE II

One hundred and ninety-six grams of maleic anhydride (2 mols) are melted and heated to a temperature of eighty degrees centigrade. Into this melt is poured one hundred and thirty-six grams (1 mol) of pentaerythritol finely ground. At this temperature the pentaerythritol dissolves quite slowly. Without allowing sufficient time for more than twenty per cent of the pentaerythritol to dissolve, the mixture is poured onto eight hundred and eighty-five grams of forty-six mesh fused alumina abrasive grain that has previously been heated to sixty degrees centigrade. After mixing thoroughly, the abrasive mix is spread in a shallow pan to cool. It is then broken up, the maleic anhydride and pentaerythritol forming a dry coating on the grain, and spread in an eight inch mold with a one and one-half inch arbor. It is then placed in a hot press, pressed to a thickness of one-half inch and cured under a steam pressure of eighty-five pounds per square inch gauge pressure (100 pounds absolute) at a temperature of one hundred and fifty degrees centigrade for twenty-four hours. The wheel so formed is a very superior product, being of high "grade hardness".

Instead of using glycerol or pentaerythritol, we may substitute therefor either of pentaglycerol or anhydroenneaheptitol in either of the above two examples. These modifications, therefore, constitute four additional examples of our invention. Furthermore, each of the six examples given is susceptible of further modification in that the maleic anhydride may be modified by the substitution for some of it of an aliphatic dicarboxylic acid, such as succinic, adipic or sebacic acids. In each of these modifications, the resin consists of a polyhydric alcohol combined with maleic anhydride and one of the aliphatic dicarboxylic acids.

As an example of this modification we may proceed according to the following:

EXAMPLE III

One hundred and seventy-six grams of maleic anhydride, sixty-six grams of adipic acid, and one hundred and fifty-three grams of pentaerythritol are heated together until they form a homogeneous solution. To this melt is then added five hundred and twenty-seven grams of maleic anhydride and as it melts and goes into solution the temperature is allowed to drop to approximately sixty degrees centigrade. Into this melt are stirred one hundred and ninety-six grams of finely ground adipic acid and four hundred and fifty-eight grams of finely ground pentaerythritol. This is then poured into nineteen thousand four hundred grams of twelve mesh fused alumina abrasive grain that has been previously heated to sixty degrees centigrade. On cooling the abrasive mixture can readily be broken up, leaving the resin constituents adhering to the grains. This coated abrasive is then spread in a sixteen inch mold with a six inch arbor and pressed in a hot press to a thickness of two and one-half inches. When baked in the hot press for twenty-four hours under eighty-five pounds per square inch steam pressure at one hundred and thirty degrees centigrade followed by twenty-four hours in an oven at one hundred and thirty-five degrees centigrade and twenty-four hours in an oven at one hundred and fifty degrees centigrade, this wheel gives very superior performance compared to one of similar structure made from the now available alkyd resins.

We have found that when as much as twenty per cent of maleic anhydride is added to other polycarboxylic acids for the manufacture of alkyd resin bonded grinding wheels a marked improvement results and benefits according to the invention are achieved.

The grinding behaviour of wheels bonded with maleic anhydride resins is distinctly superior to that of wheels made with other alkyl resins. Table III presents the results of grinding tests which we have made using wheels of the same volume percentage composition of dimensions eight inches by one-half inch by one and one-half inches run at a surface speed of six thousand feet per minute and grinding on mild steel with a constant pressure between the wheel and the work of eight and twelve kilograms respectively. Number forty-six mesh fused alumina abrasive was used in all of the wheels. The first two wheels were made with a soft structure such as is suitable for a cam grinding wheel. Here the influence of the maleic anhydride is very pronounced. The next three wheels were made with a harder structure. In this case the maleic anhydride is compared with succinic anhydride and shows greater durability.

TABLE III

| Resin | Volume structure | 8 kilograms pressure | | 12 kilograms pressure | |
|---|---|---|---|---|---|
| | | Wheel wear | Rate of cut | Wheel wear | Rate of cut |
| | | Grams | Grams | Grams | Grams |
| Maleic anhydride Pentaerythritol | 56% #46 alumina 16% resin | 7.8 | 55 | 49.7 | 177 |
| Phthalic anhydride Pentaerythritol | 56% #46 alumina 16% resin | 32.4 | 61 | Too soft to run | |
| Maleic anhydride Pentaerythritol | 60% #46 alumina 24% resin | 1.0 | 2.5 | 8.4 | 85 |
| Succinic anhydride Pentaerythritol | 60% #46 alumina 24% resin | 24.6 | 81 | 109.5 | 157 |
| Phthalic anhydride Glycerol | 60% #46 alumina 24% resin | 34.5 | 86.7 | Too soft to run | |

In the above table for all wheels except the last, the alcohol is pentaerythritol. This alcohol was chosen because it makes considerably more durable wheels than does the commonly used glycerol, and pentaerythritol has just recently been made available in commercial quantities. We prefer to use it in wheels according to the present invention. The relative results, using glycerol as the alcohol in the resin in the first four examples of Table III would have been the same.

It will thus be seen that there has been provided by this invention a method and an article in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

We claim:

1. An abrasive body consisting of abrasive grain bonded with an alkyd resin bond comprising a polyhydric alcohol and an acid at least twenty per cent of which is selected from the group consisting of maleic acid and its anhydride and fumaric acid.

2. An abrasive body consisting of abrasive grain bonded with an alkyd resin bond comprising pentaerythritol and an acid at least twenty per cent of which is selected from the group consisting of maleic acid and its anhydride and fumaric acid.

3. An abrasive body consisting of abrasive grain bonded with an alkyd resin bond comprising a polyhydric alcohol and a polybasic acid selected from the group consisting of maleic acid and its anhydride and fumaric acid.

4. An abrasive body consisting of abrasive grain bonded with an alkyd resin bond comprising pentaerythritol and a polybasic acid selected from the group consisting of maleic acid and its anhydride and fumaric acid.

SAMUEL S. KISTLER.
CARL E. BARNES.